(12) United States Patent
Choi et al.

(10) Patent No.: US 11,539,063 B1
(45) Date of Patent: Dec. 27, 2022

(54) SYSTEMS AND METHODS FOR PROCESSING HYDROGEN

(71) Applicant: AMOGY Inc., Brooklyn, NY (US)

(72) Inventors: Jongwon Choi, Brooklyn, NY (US); Young Suk Jo, Brooklyn, NY (US)

(73) Assignee: AMOGY Inc., Brooklyn, NY (US)

( * ) Notice: Subject to any disclaimer, the term of this patent is extended or adjusted under 35 U.S.C. 154(b) by 0 days.

(21) Appl. No.: 17/589,287

(22) Filed: Jan. 31, 2022

Related U.S. Application Data

(60) Provisional application No. 63/234,137, filed on Aug. 17, 2021.

(51) Int. Cl.
*H01M 8/1004* (2016.01)
*H01M 4/88* (2006.01)

(52) U.S. Cl.
CPC ....... *H01M 8/1004* (2013.01); *H01M 4/8807* (2013.01)

(58) Field of Classification Search
CPC .................................................. H01M 8/1004
See application file for complete search history.

(56) References Cited

U.S. PATENT DOCUMENTS

| | | | |
|---|---|---|---|
| 5,055,282 A | 10/1991 | Shikada et al. | |
| 6,350,540 B1 * | 2/2002 | Sugita | H01M 8/0263 429/514 |
| 6,555,084 B2 | 4/2003 | Ohtsuka | |
| 6,936,363 B2 | 8/2005 | Kordesch et al. | |
| 6,984,750 B2 | 1/2006 | Chaturvedi et al. | |
| 7,071,239 B2 | 7/2006 | Ortego, Jr. et al. | |
| 7,157,166 B2 | 1/2007 | Vajo | |
| 7,282,467 B2 | 10/2007 | Huisman et al. | |
| 8,166,926 B2 | 5/2012 | Sasaki et al. | |
| 8,440,357 B2 | 5/2013 | Hossain et al. | |
| 8,664,148 B2 | 3/2014 | Brey et al. | |
| 8,900,420 B2 | 12/2014 | Veeraraghavan et al. | |
| 8,916,300 B2 | 12/2014 | McElroy et al. | |
| 8,961,923 B2 | 2/2015 | Grannell et al. | |
| 9,236,624 B2 | 1/2016 | Page et al. | |
| 9,359,270 B2 | 6/2016 | Daly et al. | |
| 9,359,271 B2 | 6/2016 | LeViness et al. | |
| 9,506,400 B2 | 11/2016 | Tange et al. | |
| 9,896,332 B2 | 2/2018 | Hikazudani et al. | |

(Continued)

FOREIGN PATENT DOCUMENTS

| | | |
|---|---|---|
| CA | 3132213 A1 | 9/2020 |
| CN | 101172575 A | 5/2008 |

(Continued)

*Primary Examiner* — Brian R Ohara
(74) *Attorney, Agent, or Firm* — Wilson Sonsini Goodrich & Rosati

(57) ABSTRACT

The present disclosure provides a fuel cell, comprising: an anode; a cathode; and a membrane electrode assembly disposed between the anode and the cathode. The anode may comprise a gas diffusion layer with one or more channels for directing a source material through the gas diffusion layer of the anode to facilitate processing of the source material to generate an electrical current. The one or more channels may comprise one or more features configured to enhance a diffusion of the source material through the gas diffusion layer of the anode. The source material may comprise hydrogen and nitrogen.

28 Claims, 13 Drawing Sheets
(5 of 13 Drawing Sheet(s) Filed in Color)

(56) References Cited

U.S. PATENT DOCUMENTS

| | | | |
|---|---|---|---|
| 10,450,192 B2 | 10/2019 | Finkelshtain et al. | |
| 10,906,804 B2 | 2/2021 | Li et al. | |
| 10,961,890 B2 | 3/2021 | Sung et al. | |
| 11,014,809 B2 | 5/2021 | Miura | |
| 11,084,012 B2 | 8/2021 | Jiang et al. | |
| 11,084,719 B2 | 8/2021 | Andersen et al. | |
| 11,110,434 B2 | 9/2021 | Jiang et al. | |
| 11,117,809 B2 | 9/2021 | Hojlund Nielsen | |
| 11,156,168 B2 | 10/2021 | Nose et al. | |
| 2002/0028171 A1 | 3/2002 | Goetsch et al. | |
| 2006/0121322 A1* | 6/2006 | Haas | H01M 8/04303 |
| | | | 429/429 |
| 2008/0145733 A1 | 6/2008 | Asazawa et al. | |
| 2008/0171255 A1 | 7/2008 | Brantley et al. | |
| 2012/0088168 A1* | 4/2012 | Pledger | B01D 71/022 |
| | | | 429/416 |
| 2013/0189603 A1 | 7/2013 | Sakamoto et al. | |
| 2014/0287911 A1 | 9/2014 | Wang et al. | |
| 2014/0356738 A1 | 12/2014 | Bell et al. | |
| 2018/0015443 A1 | 1/2018 | Finkelshtain et al. | |
| 2020/0032676 A1 | 1/2020 | Nose et al. | |
| 2020/0062590 A1 | 2/2020 | Mccullough et al. | |
| 2020/0099072 A1 | 3/2020 | Ikemoto et al. | |
| 2020/0123006 A1 | 4/2020 | Speth et al. | |
| 2020/0197889 A1 | 6/2020 | Jo et al. | |
| 2020/0266469 A1 | 8/2020 | Kojima et al. | |
| 2020/0269208 A1 | 8/2020 | Way et al. | |
| 2020/0346937 A1 | 11/2020 | Beach et al. | |
| 2020/0388869 A1 | 12/2020 | Galbiati | |
| 2020/0398240 A1 | 12/2020 | Jiang et al. | |
| 2020/0403258 A1 | 12/2020 | Luo et al. | |
| 2021/0001311 A1 | 1/2021 | Wu et al. | |
| 2021/0113983 A1 | 4/2021 | Mortensen et al. | |
| 2021/0178377 A1 | 6/2021 | Khatiwada et al. | |
| 2021/0178378 A1 | 6/2021 | Khatiwada et al. | |
| 2021/0234179 A1 | 7/2021 | Klein et al. | |
| 2021/0237046 A1 | 8/2021 | Gascon et al. | |
| 2021/0395082 A1 | 12/2021 | Iwai | |

FOREIGN PATENT DOCUMENTS

| | | | | |
|---|---|---|---|---|
| CN | 106517092 A | 3/2017 | | |
| CN | 210528460 U | 5/2020 | | |
| CN | 210973870 U | 7/2020 | | |
| EP | 2070141 B1 | 12/2012 | | |
| EP | 3028990 B1 | 8/2017 | | |
| EP | 3059206 B1 | 8/2017 | | |
| EP | 3258524 A1 | 12/2017 | | |
| EP | 3448803 A1 | 3/2019 | | |
| JP | 2005145748 A | 6/2005 | | |
| JP | 3940551 B2 | 7/2007 | | |
| JP | 2008153091 A | 7/2008 | | |
| JP | 2009035458 A | 2/2009 | | |
| JP | 2010195642 A | 9/2010 | | |
| JP | 4666301 B2 | 4/2011 | | |
| JP | 2012005926 A | 1/2012 | | |
| JP | 5272762 B2 | 8/2013 | | |
| JP | 5272767 B2 | 8/2013 | | |
| JP | 5321230 B2 | 10/2013 | | |
| JP | 5426201 B2 | 2/2014 | | |
| JP | 2016131065 A | 7/2016 | | |
| JP | 2016198720 A | 12/2016 | | |
| JP | 2018076214 A | 5/2018 | | |
| JP | 2019053854 A | 4/2019 | | |
| JP | 2019177381 A | 10/2019 | | |
| JP | 2020040860 A | 3/2020 | | |
| JP | WO2018221701 A1 | 4/2020 | | |
| JP | 2020196646 A | 12/2020 | | |
| JP | 2020197169 A | 12/2020 | | |
| JP | 2021095300 A | 6/2021 | | |
| KR | 20040039951 A | 5/2004 | | |
| KR | 101173456 B1 | 8/2012 | | |
| KR | 101388755 B1 | 4/2014 | | |
| KR | 102174654 B1 | 11/2020 | | |
| KR | 20210136381 A | 11/2021 | | |
| KR | 20220005829 A | 1/2022 | | |
| NL | 2017963 B1 | 6/2018 | | |
| TW | I274604 B | 3/2007 | | |
| WO | WO-9840311 A1 | 9/1998 | | |
| WO | WO-0183108 A1 | 11/2001 | | |
| WO | WO-0187770 A1 | 11/2001 | | |
| WO | WO-0208117 A1 | 1/2002 | | |
| WO | WO-02071451 A2 | 9/2002 | | |
| WO | WO-2005091418 A2 | 9/2005 | | |
| WO | WO-2006113451 A2 | 10/2006 | | |
| WO | WO-2007119262 A2 | 10/2007 | | |
| WO | WO-2008024089 A2 | 2/2008 | | |
| WO | WO-2009098452 A2 | 8/2009 | | |
| WO | WO-2009116679 A1 | 9/2009 | | |
| WO | WO-2010116874 A3 | 4/2011 | | |
| WO | WO-2011107279 A1 | 9/2011 | | |
| WO | WO-2012039183 A1 | 3/2012 | | |
| WO | WO-2013057473 A1 | 4/2013 | | |
| WO | WO-2013063169 A1 | 5/2013 | | |
| WO | WO-2013122849 A1 | 8/2013 | | |
| WO | WO-2013142123 A1 | 9/2013 | | |
| WO | WO-2014054277 A1 | 4/2014 | | |
| WO | WO-2015044691 A1 | 4/2015 | | |
| WO | WO-2015074127 A1 | 5/2015 | | |
| WO | WO-2016013652 A1 | 1/2016 | | |
| WO | WO-2016051633 A1 * | 4/2016 | | H01M 4/8626 |
| WO | WO-2017099143 A1 | 6/2017 | | |
| WO | WO-2017186614 A1 | 11/2017 | | |
| WO | WO-2018185663 A1 | 10/2018 | | |
| WO | WO-2018198635 A1 | 11/2018 | | |
| WO | WO-2019032591 A1 | 2/2019 | | |
| WO | WO-2019038251 A1 | 2/2019 | | |
| WO | WO-2021063795 A1 | 4/2021 | | |
| WO | WO-2021168226 A1 | 8/2021 | | |
| WO | WO-2021221943 A1 | 11/2021 | | |
| WO | WO-2021225254 A1 | 11/2021 | | |
| WO | WO-2022010178 A1 | 1/2022 | | |

* cited by examiner

SYSTEMS AND METHODS FOR PROCESSING HYDROGEN

CROSS REFERENCE

This application claims priority to U.S. Provisional Patent Application No. 63/234,137 filed on Aug. 17, 2021, which application is incorporated herein by reference in its entirety for all purposes.

BACKGROUND

Various systems may be powered using a fuel source. The fuel source may have a specific energy corresponding to an amount of energy stored or extractable per unit mass of fuel. The fuel source may be provided to the various systems to enable such systems to generate energy (e.g., electrical energy) and/or deliver power (e.g., for movement or transportation purposes).

SUMMARY

Hydrogen can be leveraged as a clean energy source to power various systems. Hydrogen can provide a distinct advantage over other types of fuel such as diesel, gasoline, or jet fuel, which have specific energies of about 45 megajoules per kilogram (MJ/kg) (heat), or lithium-ion batteries, which have a specific energy of about 0.95 MJ/kg (electrical). In contrast, hydrogen has a specific energy of over 140 MJ/kg (heat). As such, 1 kg of hydrogen can provide the same amount of energy as about 3 kg of gasoline or kerosene. Thus, hydrogen as a fuel source can help to reduce the amount of fuel (by mass) needed to provide a comparable amount of energy as other traditional sources of fuel. Further, systems that use hydrogen as a fuel source (e.g., as a combustion reactant) generally produce benign or nontoxic byproducts such as water while producing minimal or near zero carbon dioxide and nitrous oxide emissions, thereby reducing the environmental impacts of various systems (e.g., modes of transportation) that use hydrogen as a fuel source.

Recognized herein are various limitations with conventional systems and methods for processing hydrogen and/or mixtures of hydrogen and nitrogen to produce electrical energy. For example, commercially available fuel cells may exhibit degraded performance over time when processing source materials comprising hydrogen and other impurities (e.g., gases such as ammonia and/or nitrogen). Since hydrogen extracted from hydrogen carriers may comprise one or more other elements or compounds that can negatively impact fuel cell performance (e.g., conversion efficiency of a source material into electrical energy), commercially available fuel cells may require separation of hydrogen from other materials before the hydrogen is fed to a fuel cell, which can be time consuming and resource intensive.

The present disclosure provides systems and methods to address at least the abovementioned shortcomings of conventional systems for processing a source material to generate electrical energy. The present application relates generally to systems and methods for processing a source material (e.g., hydrogen and/or nitrogen) to produce energy (e.g., electrical energy). The energy may be used to power a system such as a vehicle. In some embodiments, the vehicle may comprise a drone, a light-duty vehicle, a heavy-duty vehicle, or a maritime vehicle. In some embodiments, the vehicle may be configured to be operated by a human or a computer. In some embodiments, the vehicle may be autonomous or semi-autonomous. The source material may comprise hydrogen and other elements or compounds. In some instances, the source material may comprise a mixture of hydrogen and nitrogen. The source material may or may not comprise other impurities. In some cases, the source material may be filtered before being provided to a fuel cell. Such filtering may be used to remove carbon monoxide and/or ammonia from the source material. The systems and methods of the present disclosure may be used to convert hydrogen mixtures into electrical energy without requiring filtration or purification of hydrogen mixtures to remove nitrogen and/or ammonia.

In one aspect, the present disclosure provides a fuel cell for processing hydrogen to generate an electrical current. The fuel cell may comprise an anode, a cathode, and a membrane electrode assembly disposed between the anode and the cathode. In some embodiments, the anode may comprise an anode gas diffusion layer with one or more channels for directing a source material through the anode to facilitate processing of the source material to generate an electrical current. In some embodiments, the one or more channels may comprise one or more surface features configured to (i) enhance a diffusion and transport of the source material through the anode gas diffusion layer and (ii) facilitate a purging of select materials from the anode gas diffusion layer. In some embodiments, the source material may comprise hydrogen and/or nitrogen. In some embodiments, the select materials may comprise at least nitrogen. In some embodiments, the select materials may comprise one or more impurities or unconverted ammonia.

In some embodiments, processing of the source material may comprise a dissociation of one or more hydrogen molecules of the source material into one or more protons and one or more electrons. In some embodiments, the anode gas diffusion layer may comprise a felt material or a paper material. In some embodiments, the felt or paper material may be a carbon-based material.

In some embodiments, the one or more surface features may comprise one or more cuts or grooves on a surface of the one or more channels. In some embodiments, the one or more cuts or grooves may extend across a portion of the surface of the one or more channels. In some embodiments, the one or more cuts or grooves may comprise two or more cuts or grooves that are parallel to each other. In some embodiments, the one or more cuts or grooves may comprise two or more cuts or grooves that are perpendicular to each other. In some embodiments, the one or more cuts or grooves may comprise two or more cuts or grooves that are disposed at an angle relative to each other. The angle may range from 0 degrees to about 90 degrees. In some embodiments, the one or more cuts or grooves may comprise two or more cuts or grooves that intersect with each other. In some embodiments, the one or more cuts or grooves may comprise two or more cuts or grooves that do not intersect. In some embodiments, the one or more surface features may comprise one or more cutouts or openings on a surface of the one or more channels. In some embodiments, the one or more cutouts or openings may extend across a portion of the surface of the one or more channels. In some embodiments, the one or more cutouts or openings may comprise two or more cutouts or openings that are parallel to each other. In some embodiments, the one or more cutouts or openings may comprise two or more cutouts or openings that are perpendicular to each other. In some embodiments, the one or more cutouts or openings may comprise two or more cutouts or openings that are disposed at an angle relative to each other. In some embodiments, the angle may range from 0 degrees to about 90 degrees. In some embodiments, the one or more cutouts or openings may comprise two or more cuts or grooves that intersect with each other. In some embodiments, the one or more cutouts or openings may comprise two or more cutouts or openings that do not intersect.

In some embodiments, the anode gas diffusion layer may comprise one or more layers. In some embodiments, the one or more layers may comprise two or more layers. In some embodiments, at least one layer of the two or more layers may comprise the one or more surface features. In some embodiments, the one or more surface features may comprise (i) one or more cuts or grooves or (ii) one or more cutouts or openings. In some embodiments, the two or more layers may comprise a first layer comprising a first set of surface features and a second layer comprising a second set of surface features. In some embodiments, the first set of features and the second set of features may comprise a same or similar set of features. In some embodiments, the first set of features and the second set of features may comprise different sets of features having different shapes, dimensions, positions, or orientations. In some embodiments, the first set of features and the second set of features may overlap or partially overlap. In some embodiments, the first set of features and the second set of features may not or need not overlap.

In some embodiments, the cathode may comprise one or more air flow channels. In some embodiments, the cathode may comprise a cathode current collecting layer and a cathode gas diffusion layer. In some embodiments, the one or more air flow channels or a subset thereof may be configured to function as a current collecting layer. In some embodiments, the anode may further comprise an anode current collecting layer.

In another aspect, the present disclosure provides a fuel cell system. The fuel cell system may comprise a plurality of fuel cells arranged adjacent to or on top of each other. The plurality of fuel cells may comprise a fuel cell with an anode, a cathode, and a membrane electrode assembly disposed between the anode and the cathode. In some embodiments, the anode may comprise an anode gas diffusion layer with one or more channels for directing a source material through the anode to facilitate processing of the source material to generate an electrical current. In some embodiments, the one or more channels may comprise one or more surface features configured to (i) enhance a diffusion and transport of the source material through the anode gas diffusion layer and (ii) facilitate a purging of select materials from the anode gas diffusion layer.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
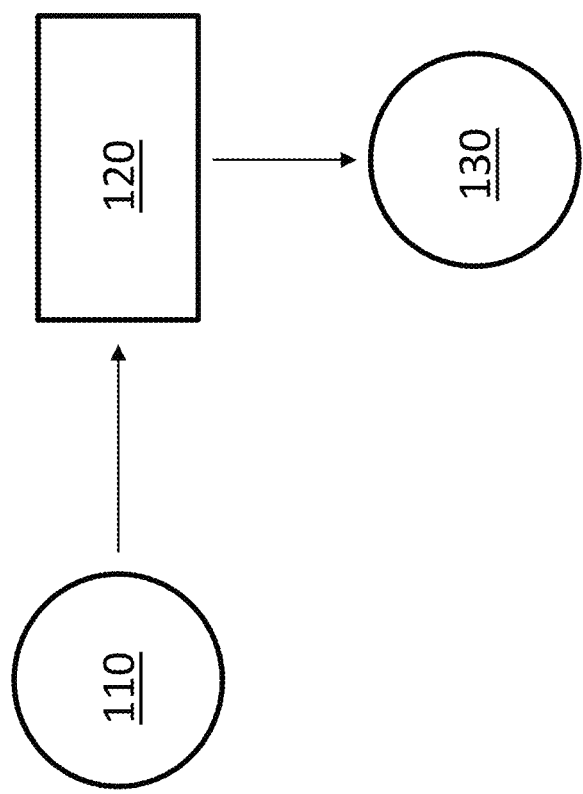
FIG. 1 schematically illustrates a system for processing a source material comprising hydrogen and nitrogen, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

Fuel Cell

In an aspect, the present disclosure provides one or more fuel cells for processing a source material. The source material may be processed to generate energy (e.g., electrical energy). The source material may comprise, for example, hydrogen, nitrogen, and/or ammonia. The source material may be provided or received from one or more components or subcomponents of an ammonia reforming system (e.g., a system for cracking or decomposing ammonia into hydrogen and/or nitrogen). The one or more fuel cells may comprise one or more hydrogen fuel cells configured to use or process the source material to generate electrical energy. Such electrical energy may be used to power various systems, vehicles, and/or devices.

The one or more fuel cells may be provided within a fuel cell module. The fuel cell module may comprise a stack of fuel cells or multiple stacks of fuel cells. The fuel cells may be arranged in a lateral configuration or a circular configuration. The fuel cells in the fuel cell stack may be arranged on top of each other and/or next to each other. Each of the fuel cells may comprise one or more inlets for receiving a source material. The fuel cells may be configured to process the source material to generate electrical energy.

The fuel cells disclosed herein may comprise various types of fuel cells. In some cases, the fuel cells may comprise one or more proton-exchange membrane fuel cells (PEMFC) having a proton-conducting polymer electrolyte membrane. A proton exchange membrane fuel cell can be used to transform the chemical energy liberated during the electrochemical reaction of hydrogen and oxygen into electrical energy. In some cases, the PEMFC may comprise a proton-conducting polymer membrane that separates the anode and cathode sides of the PEMFC. The membrane may contain an electrolyte. On the anode side, a source material (e.g., hydrogen, nitrogen, and/or ammonia) may diffuse to the anode catalyst where it dissociates into protons and electrons. The protons may be conducted through the membrane comprising the electrolyte to the cathode, while the electrons are directed to travel along an external circuit (thereby supplying power via an electrical current) because the membrane is electrically insulating. On the cathode catalyst, one or more oxygen molecules may react with the protons and the electrons (which have traveled through the external circuit) to form a byproduct (e.g., water).

The fuel cells of the present disclosure may comprise one or more PEMFCs that are adapted for use with a mixture of hydrogen and/or nitrogen. In some cases, the fuel cells of the present disclosure may be used to generate electrical energy from hydrogen gas mixtures containing impurities that would otherwise degrade the performance of conventional fuel cells (some of which may require up to 99.7% pure hydrogen as a source material). The fuel cells of the present disclosure may provide better performance compared to fuel cells with a dead-end type design that does not allow processing of $H_2/N_2$ mixtures, since $N_2$ concentrations may build up with no appropriate purging. The fuel cells disclosed herein may also provide enhanced performance compared to fuel cells with a flow-through design that allows $H_2/N_2$ mixtures, since the fuel cells in such conventional flow-through designs can still experience fuel starvation if excess $H_2/N_2$ mixture is not provided. The presently disclosed fuel cells may be configured to utilize and process a $H_2/N_2$ mixture without experiencing similar degradations in performance due to a buildup of $N_2$ concentrations. Such advantages may be realized using, for example, optimally configured anode channels for the fuel cells.

In an aspect, the present disclosure provides a fuel cell design that is compatible with gas mixtures containing hydrogen, nitrogen, ammonia, and/or other reformate gases. Such gas mixtures may be provided from an ammonia reformer or a reactor configured to process (i.e., catalytically decompose) ammonia. The fuel cell design may be adapted for use in a fuel cell stack comprising one or more fuel cells. The fuel cell stack or the one or more fuel cells of the fuel cell stack may be in fluid communication with the ammonia reformer or reactor in order to receive the source materials needed to generate electricity.

FIG. 1 schematically illustrates a block diagram of an exemplary system for processing a source material 110 to produce electrical energy. The source material 110 may comprise hydrogen. In some cases, the source material 110 may further comprise one or more other gases, such as, for example, oxygen ($O_2$), nitrogen ($N_2$) and/or ammonia ($NH_3$). The source material 110 may comprise one or more reformate gases that are generated by an ammonia processing system. The ammonia processing system may comprise a system (e.g., a reactor or a reformer) that is configured to crack or decompose a hydrogen carrier (e.g., ammonia, a liquid organic hydrogen carrier (LOHC), formic acid (HCOOH), or methanol ($CH_3OH$)) to extract or produce hydrogen. In some cases, the source material 110 may comprise various impurities, such as unconverted ammonia that has passed through the ammonia processing system, nitrogen that has mixed with the hydrogen extracted using the ammonia processing system, and/or other trace materials within the ammonia processing system.

The source material 110 may be provided to a fuel cell 120. The fuel cell 120 may be designed or configured to process the hydrogen to produce electrical energy 130. The electrical energy 130 may be used to power various system, vehicles, and/or devices, including, for example, terrestrial, aerial, or aquatic vehicles.

As described above, the one or more fuel cells 120 may be used to generate electrical energy 130 (i.e., an electrical current or a flow of electrons) using the source material 110, which may comprise hydrogen and/or nitrogen. In some cases, the one or more fuel cells may generate the electrical energy 130 through an electrochemical reaction between fuels. The fuels may comprise the hydrogen and/or the nitrogen in the source material 110. The electricity generated by the fuel cells may be used to power one or more systems, vehicles, or devices. In some embodiments, excess electricity generated by the fuel cells may be stored in one or more energy storage units (e.g., batteries) for future use. In some optional embodiments, the fuel cells may be provided as part of a larger fuel cell system. In some non-limiting examples, the fuel cell system may comprise an electrolysis module. Electrolysis of a byproduct of the one or more fuel cells (e.g., water) may allow the byproduct to be removed, through decomposition of the byproduct into one or more constituent elements (e.g., oxygen and/or hydrogen). Electrolysis of the byproduct can also generate additional fuel (e.g., hydrogen) for the fuel cell.

In some cases, the fuel cell units may receive the source material from one or more reformers. The one or more reformers may be configured to perform a catalytic decomposition or cracking of ammonia to extract and/or produce hydrogen. The exit flow from the reformers may comprise the extracted hydrogen and/or other gases (e.g., nitrogen and/or ammonia). The exit flow may correspond to the source material usable by the fuel cells to generate electrical energy. In some cases, the reformers may be operated using heat energy. In some cases, the reformers may be heated using a combustor that generates heat energy to drive the operation of the reformers. In some cases, the heat energy may be generated from the combustion of a chemical compound (e.g., hydrogen or a hydrocarbon). The hydrogen that is generated and/or extracted using the reformers may be provided to the one or more fuel cells, which may produce electrical energy to power one or more systems, sub-systems, or devices requiring electrical energy to operate. In some cases, the hydrogen generated and/or extracted using the reformers may be provided to one or more other reactors or reformers. In such cases, the one or more other reactors or reformers may be configured to combust the hydrogen to generate thermal energy. Such thermal energy may be used to heat the one or more other reactors or reformers to facilitate a further catalytic decomposition or cracking of ammonia to extract and/or produce additional hydrogen. In some cases, the reformers or reactors may be heated using electrical heating, resistive heating, or Joule heating. In such cases, a current may be passed through a catalyst or a catalyst bed to heat the catalyst directly.

Figure 2:
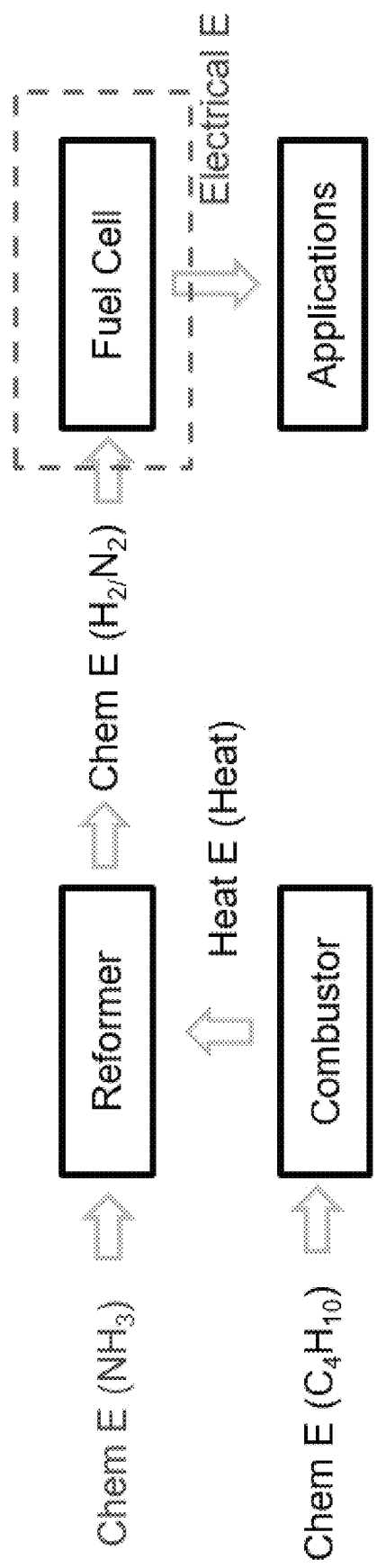
FIG. 2 schematically illustrates a process for feeding reformate gas to a fuel cell, in accordance with some embodiments.

FIG. 2 schematically illustrates a process for feeding reformate gas to a fuel cell, in accordance with some embodiments. The reformate gas may comprise a mixture of hydrogen and nitrogen. The mixture may comprise a ratio of hydrogen gas to nitrogen gas by weight or volume. The ratio may be, for example, X:Y, where X corresponds to hydrogen (e.g., 3 for ammonia reforming) and Y corresponds to nitrogen (e.g., 1 for ammonia reforming) in volume basis ratio, and where X and Y are any integer greater than or equal to 1. The reformate gases may comprise one or more gases constituting the exit flow from a reformer (or any components or subcomponents thereof). The reformer may comprise an ammonia reformer for catalytically decomposing ammonia. The catalytic decomposition of ammonia may be driven using a heat source. The heat source may comprise one or more combustors and/or one or more electrical heaters. The one or more combustors may be configured to combust hydrogen, ammonia, one or more hydrocarbons, or any combination thereof to generate thermal energy. The one or more electrical heaters may be configured to covert electrical energy to thermal energy via joule heating mechanism. The thermal energy may be used to drive the catalytic decomposition of ammonia.

Figure 3:
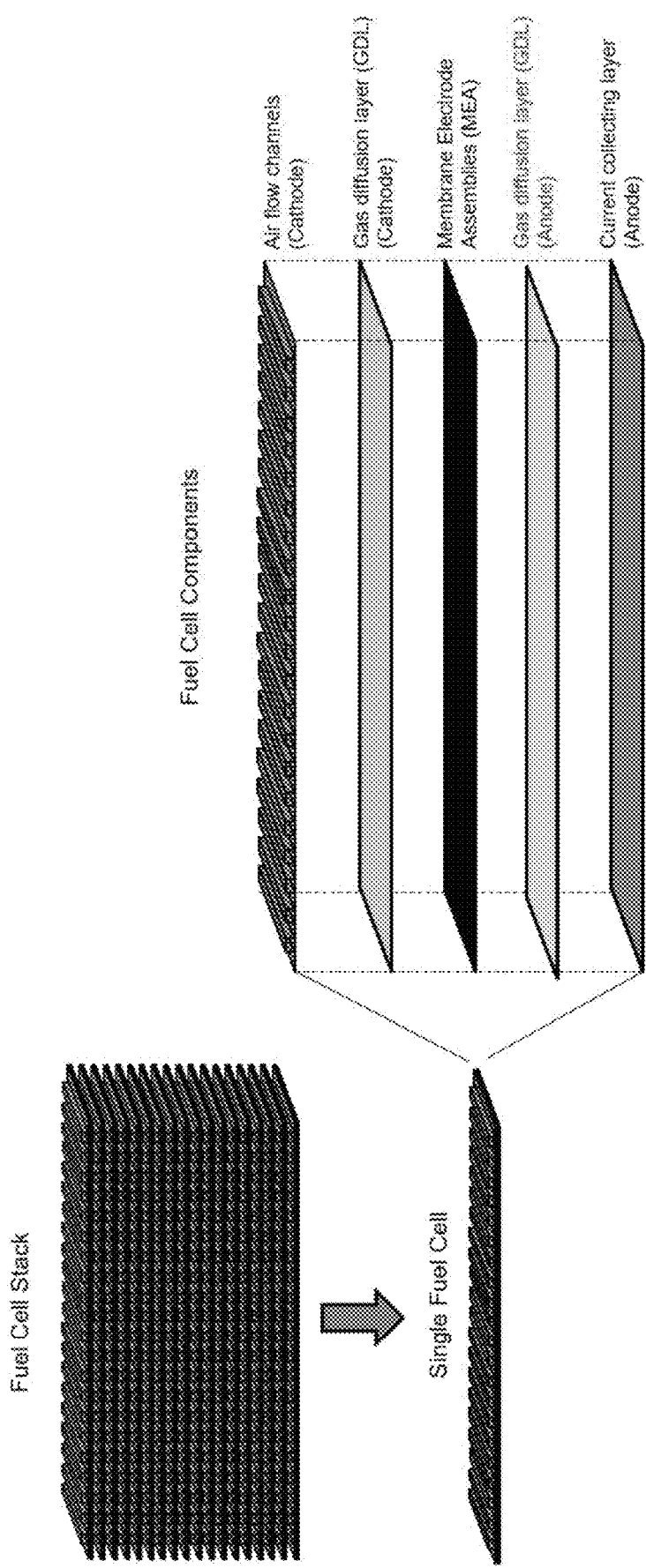
FIG. 3 schematically illustrates a stack of fuel cells comprising a plurality of fuel cells, in accordance with some embodiments.

FIG. 3 schematically illustrates a stack of fuel cells comprising a plurality of fuel cells, in accordance with some embodiments. Each fuel cell of the plurality of fuel cells may comprise one or more components. The one or more components may comprise one or more air flow channels for a cathode, a current collecting layer for the cathode, and a gas diffusion layer (GDL) for the cathode. In some cases, the one or more components may further comprise a gas diffusion layer (GDL) for an anode and a current collecting layer for the anode. In some cases, the one or more components may further comprise a membrane electrode assembly disposed between the GDL of the cathode and the GDL of the anode.

Figure 4:
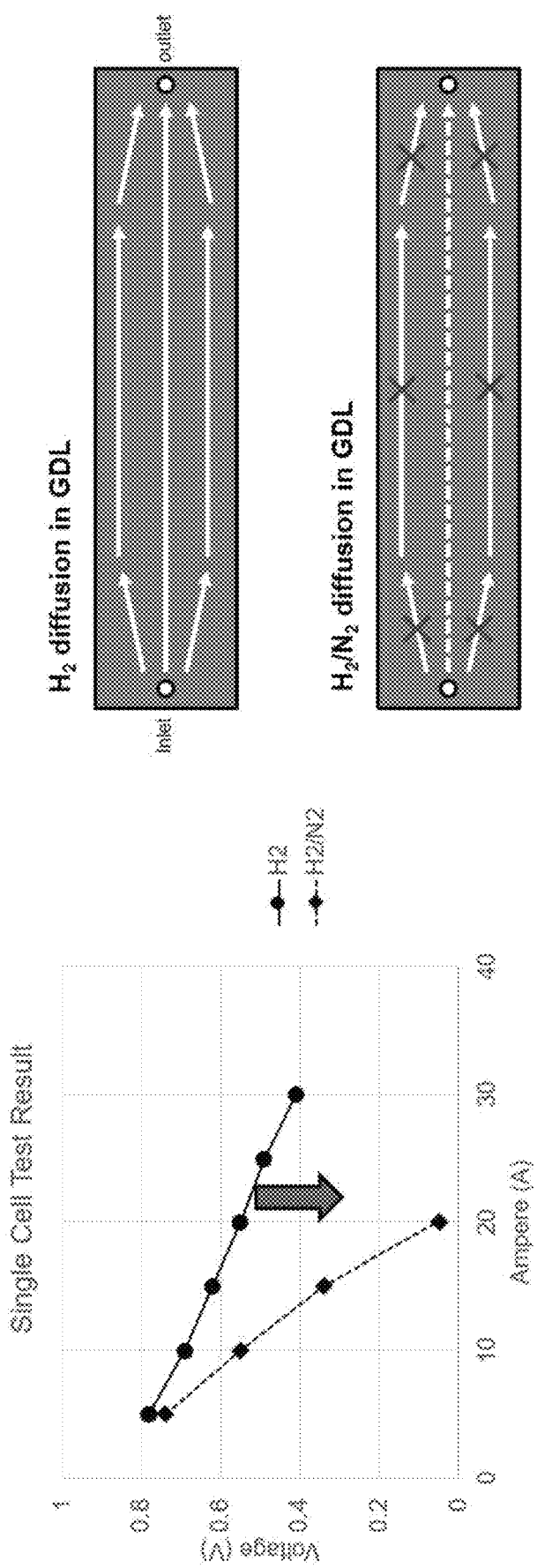
FIG. 4 schematically illustrates $H_2/N_2$ diffusion in a gas diffusion layer of a conventional fuel cell.

FIG. 4 schematically illustrates $H_2/N_2$ diffusion and transport in a gas diffusion layer (GDL) of a conventional fuel cell. In cases where the GDL is used for diffusion and transport of hydrogen, the hydrogen may flow from an inlet of the GDL to an outlet of the GDL. As the Hydrogen flows through the GDL, it may also diffuse to the proton-exchange membrane where the dissociation of electrons takes place. On the other hand, in cases where the GDL is used for transport of both hydrogen and nitrogen (e.g., a hydrogen/nitrogen mixture), the transport of hydrogen may be restricted, in part due to the buildup or accumulation of nitrogen. This can lead to reduced fuel cell performance and/or fuel cell starvation, and the fuel cell performance may be dramatically reduced.

Figure 5:
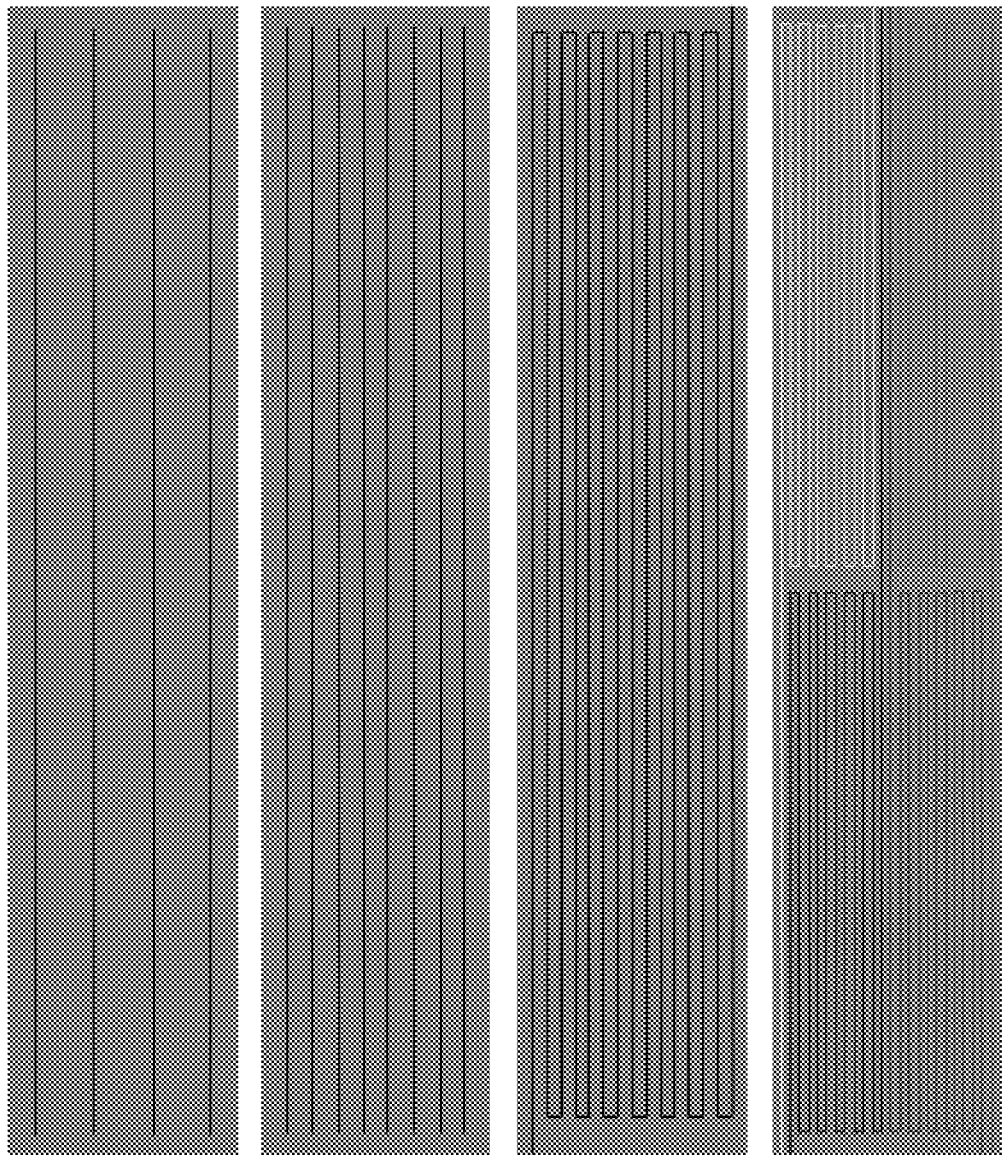
FIG. 5 schematically illustrates various examples of cut configurations that may be utilized for an anode channel of a fuel cell, in accordance with some embodiments.

FIG. 5 schematically illustrates various examples of cut configurations that may be utilized for an anode channel of a fuel cell. The cut configurations may comprise a plurality of cuts across a surface of the anode channel of the fuel cell. The plurality of cuts may comprise one or more cuts into the surface of the anode channel to reduce the buildup of nitrogen in the anode and facilitate the outflow of nitrogen from the fuel cell so that the nitrogen does not accumulate in the gas diffusion layer of the anode. The cuts may have a depth ranging from about 0.01 millimeter (mm) to about 10 mm.

In some cases, the cut configurations may comprise one or more cuts extending across at least a portion of the surface of the anode channel. In some cases, the one or more cuts may be parallel to each other. In other cases, the one or more cuts may not or need not be parallel to each other. In some cases, the cuts may comprise one or more horizontal cuts extending along a length of the anode channel and/or one or more vertical cuts extending along a height of the anode channel. The one or more horizontal cuts and the one or more vertical cuts may or may not intersect with each other. In some cases, the surface of the anode channel may comprise one or more sets of cut configurations. The one or more sets of cut configurations may be located on different portions or regions of the surface of the anode channel. In some cases, the one or more sets of cut configurations may be distributed across different quadrants of the surface of the anode channel. In some cases, the one or more cuts may be disposed at an angle relative to each other. In some cases, the one or more cuts may be disposed at a plurality of different angles relative to each other.

Figure 6:
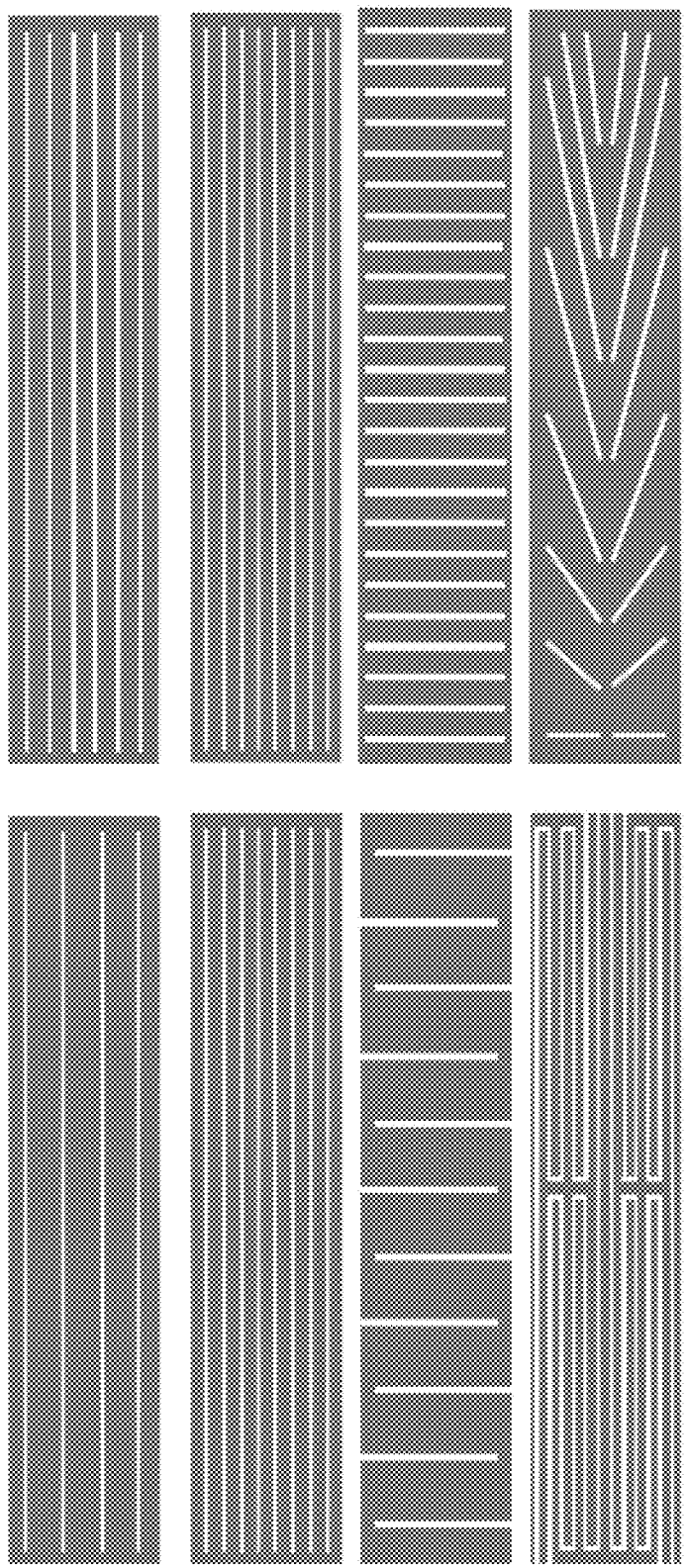
FIG. 6 schematically illustrates various examples of cutout configurations that may be utilized for an anode channel of a fuel cell, in accordance with some embodiments.

FIG. 6 schematically illustrates various examples of cutout configurations that may be utilized for an anode channel of a fuel cell. The cutout configurations may comprise a plurality of cutouts (e.g., openings) across a surface of the anode channel of the fuel cell. The plurality of cutouts may comprise one or more cutouts in the surface of the anode channel to reduce the buildup of nitrogen in the anode and facilitate the outflow of nitrogen from the fuel cell so that the nitrogen does not accumulate in the gas diffusion layer of the anode.

In some cases, the cutout configurations may comprise one or more cutouts extending across at least a portion of the surface of the anode channel. In some cases, the one or more cutouts may be parallel to each other. In other cases, the one or more cutouts may not or need not be parallel to each other. In some cases, the cutouts may comprise one or more horizontal cutouts extending along a length of the anode channel and/or one or more vertical cutouts extending along a height of the anode channel. The one or more horizontal cutouts and the one or more vertical cutouts may or may not intersect with each other. In some cases, the surface of the anode channel may comprise one or more sets of cutout configurations. The one or more sets of cutout configurations may be located on different portions or regions of the surface of the anode channel. In some cases, the one or more sets of cutout configurations may be distributed across different quadrants of the surface of the anode channel. In some cases, the one or more cutouts may be disposed at an angle relative to each other. In some cases, the one or more cutouts may be disposed at a plurality of different angles relative to each other.

Figure 7:
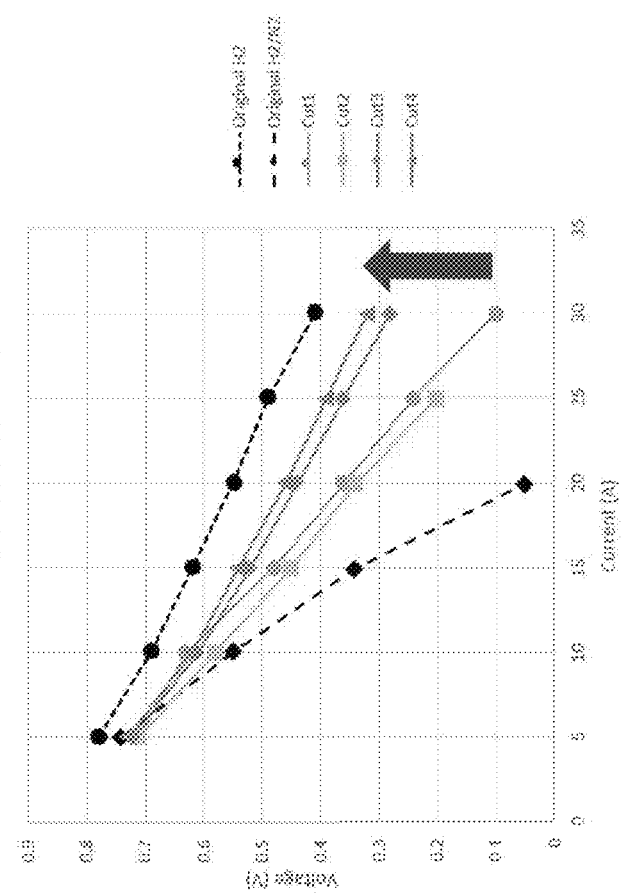
FIG. 7 schematically illustrates performance improvements for anode channels comprising one or more cuts, in accordance with some embodiments.
Figure 7:
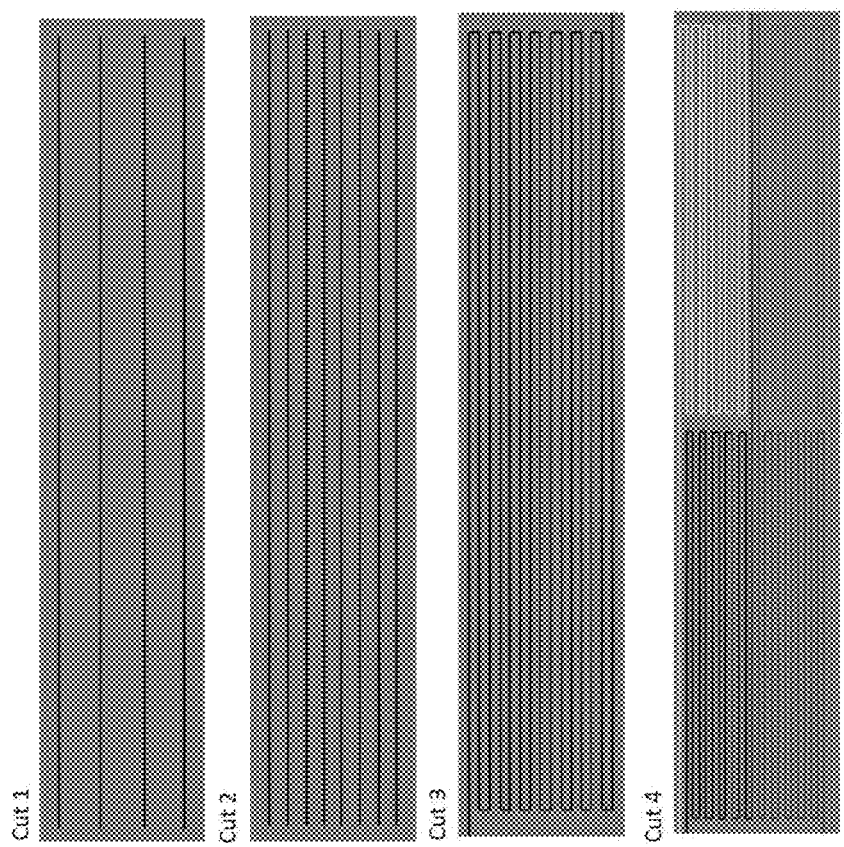

FIG. 7 schematically illustrates performance improvements for anode channels comprising one or more cuts. In instances where a mixture of hydrogen and nitrogen (e.g., 3:1 volume ratio) is provided to a fuel cell for processing to generate electrical energy, the output voltage of a fuel cell comprising one or more cut configurations may be significantly greater than that of a fuel cell without any cuts in the anode channels. In some cases, a fuel cell comprising a higher density of cuts on the surface of the anode channel may exhibit better performance (e.g., a higher output voltage when processing a hydrogen/nitrogen mixture to generate electrical energy) compared to a fuel cell with a lower density of cuts on the surface of the anode channel.

Figure 8:
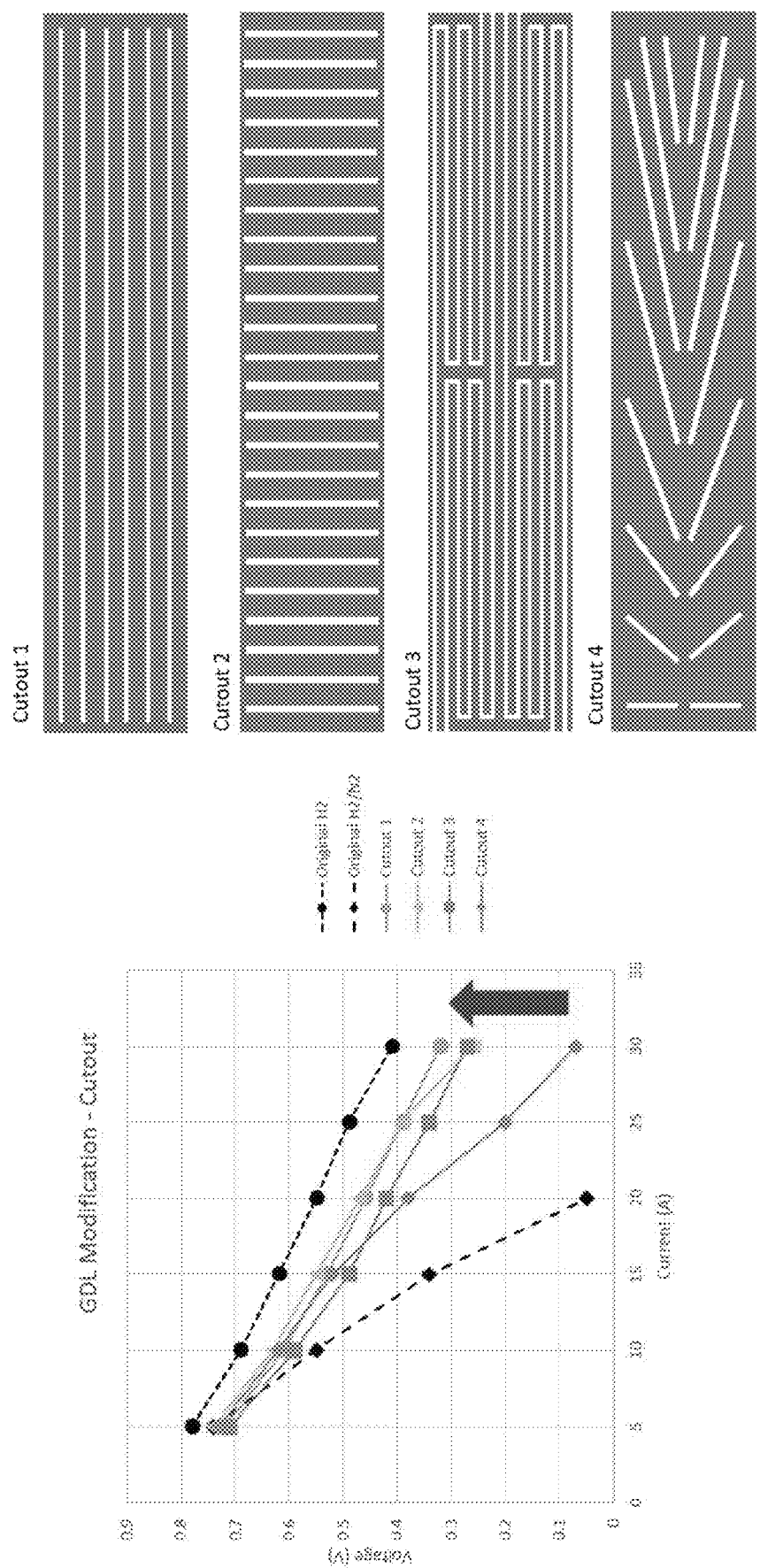
FIG. 8 schematically illustrates performance improvements for anode channels comprising one or more cutouts, in accordance with some embodiments.

FIG. 8 schematically illustrates performance improvements for anode channels comprising one or more cutouts. In instances where a mixture of hydrogen and nitrogen (3:1 volume ratio) is provided to a fuel cell for processing to generate electrical energy, the output voltage of a fuel cell comprising one or more cutout configurations may be significantly greater than that of a fuel cell without any cutouts in the anode channels. In some cases, a fuel cell comprising a higher density of cutouts on the surface of the anode channel may exhibit better performance (e.g., a higher output voltage when processing a hydrogen/nitrogen mixture to generate electrical energy) compared to a fuel cell with a lower density of cutouts on the surface of the anode channel.

Figure 9:
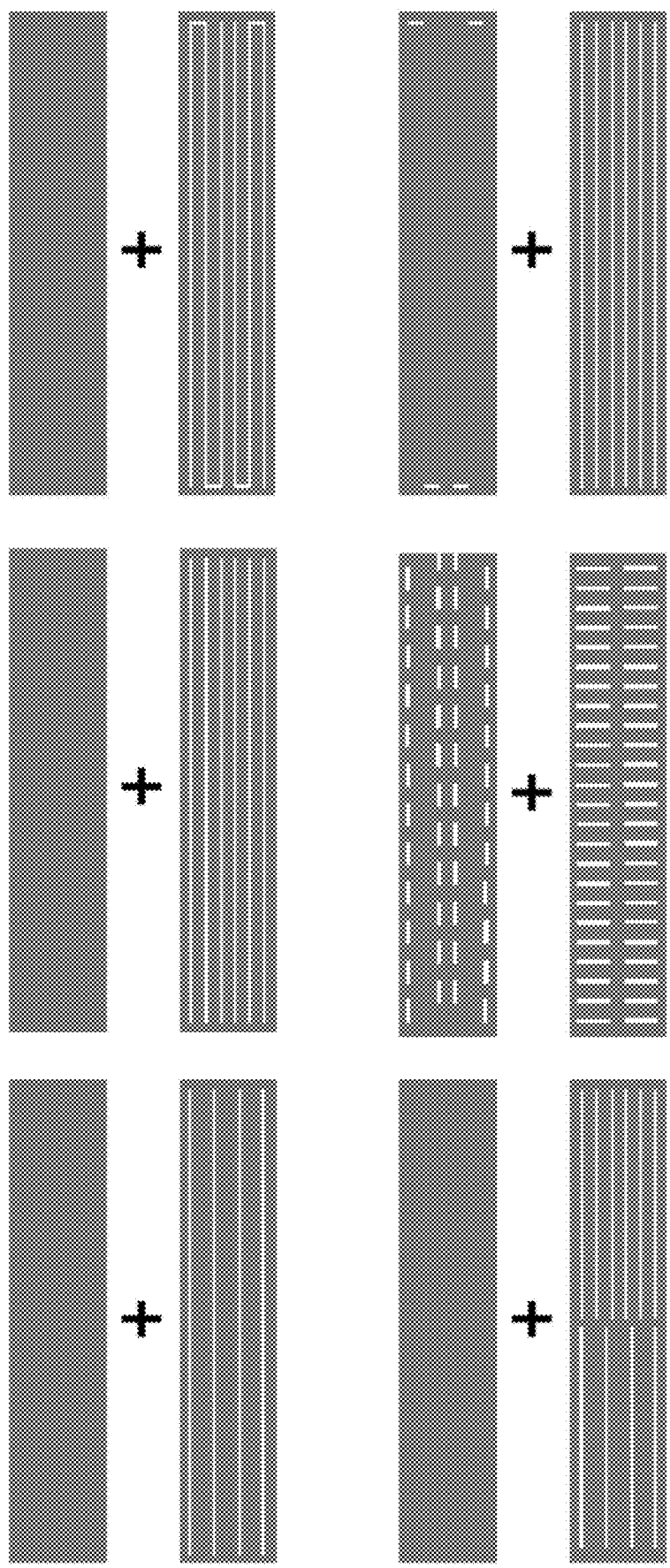
FIG. 9 schematically illustrates various examples of multi-layer anode channel designs, in accordance with some embodiments.

FIG. 9 schematically illustrates various examples of multi-layer anode channel designs that can be implemented to enhance fuel cell performance when the fuel cell is used to process a gaseous mixture of hydrogen and nitrogen to generate electrical energy. The multi-layer anode channel may comprise a plurality of layers. The plurality of layers may comprise at least a first layer and a second layer. At least one of the first layer and the second layer may comprise one or more cuts and/or one or more cutouts. In some cases, a first layer of the plurality of layers may not have any cuts or cutouts. In such cases, a second layer of the plurality of layers may comprise one or more cuts and/or one or more cutouts. In some cases, each of the first layer and the second layer may comprise one or more cuts and/or one or more cutouts. The cuts or cutouts of the first layer may or may not be aligned with the cuts or cutouts of the second layer. In some cases, the first layer may comprise a first set of cuts or cutouts and the second layer may comprise a second set of cuts or cutouts. The first and second sets of cuts or cutouts may or may not overlap each other. In some cases, the first and second sets of cuts or cutouts may comprise different patterns of cuts or cutouts. In some cases, the first and second sets of cuts or cutouts may comprise a combination of horizontal and vertical cuts or cutouts. In some cases, the first set of cuts or cutouts may comprise a plurality of horizontal cuts or cutouts, and the second set of cuts or cutouts may comprise a plurality of vertical cuts or cutouts. In some cases, the first set of cuts or cutouts may comprise a plurality of vertical cuts or cutouts, and the second set of cuts or cutouts may comprise a plurality of horizontal cuts or cutouts.

As described above, in some cases, the one or more cuts and/or the one or more cutouts may extend across at least a portion of the surface of the anode channel. In some cases, the one or more cuts and/or the one or more cutouts may be parallel to each other. In other cases, the one or more cuts and/or the one or more cutouts may not or need not be parallel to each other. In some cases, the one or more cuts and/or the one or more cutouts may comprise one or more horizontal cuts or cutouts extending along a length of the anode channel and/or one or more vertical cuts or cutouts extending along a height of the anode channel. The one or more horizontal cuts or cutouts and the one or more vertical cuts or cutouts may or may not intersect with each other. In some cases, the surface of the anode channel may comprise one or more sets of cut configurations or cutout configurations. The one or more sets of cut configurations or cutout configurations may be located on different portions or regions of the surface of the anode channel. In some cases, the one or more sets of cut configurations or cutout configurations may be distributed across different quadrants of the surface of the anode channel. In some cases, the one or more cuts or cutouts may be disposed at an angle relative to each other. In some cases, the one or more cuts or cutouts may be disposed at a plurality of different angles relative to each other.

Figure 10:
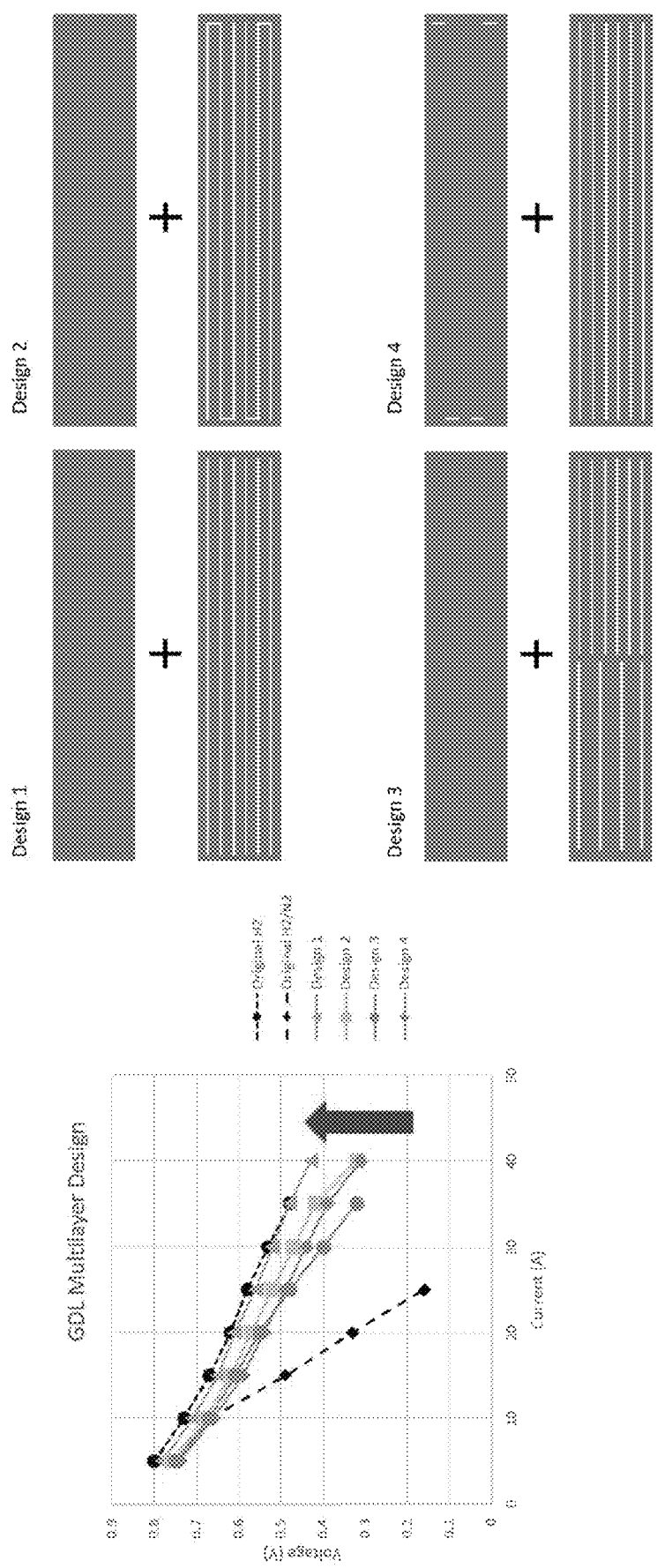
FIG. 10 schematically illustrates performance improvements for anode channels comprising various multilayer designs, in accordance with some embodiments.

FIG. 10 schematically illustrates performance improvements for anode channels comprising various multilayer anode channel designs. As described above, the multilayer anode channel designs may comprise a plurality of layers comprising one or more cuts or cutouts. In instances where a mixture of hydrogen and nitrogen is provided to a fuel cell for processing to generate electrical energy, the output voltage of a fuel cell comprising a multilayer anode channel design may be significantly greater than that of a conventional fuel cell without such a multilayer anode channel design.

Figure 11:
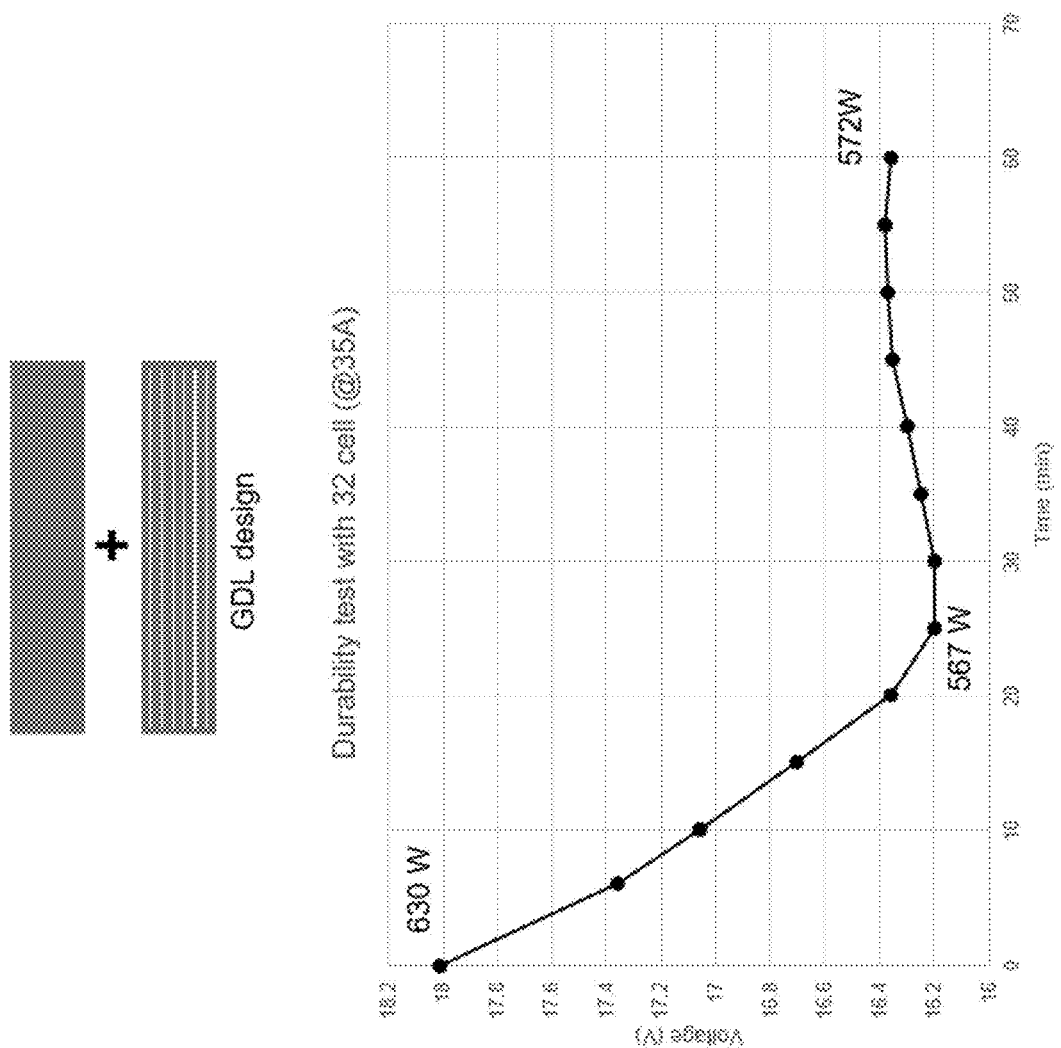
FIG. 11 schematically illustrates durability testing results for a stack of fuel cells with a multi-layer gas diffusion layer design when nitrogen is present in a hydrogen gas mixture (3:1 hydrogen and nitrogen volume ratio), in accordance with some embodiments.

FIG. 11 schematically illustrates durability testing results for a stack of fuel cells with a multi-layer gas diffusion layer design when nitrogen is present in a hydrogen gas mixture, in accordance with some embodiments. The durability testing was conducted using a fuel cell stack comprising 32 fuel cells and a gas diffusion layer comprising a double layer design. A gaseous mixture of hydrogen and nitrogen was provided to the fuel cell stack for a one-hour endurance test, the gaseous mixture comprising a hydrogen/nitrogen ratio of 3:1. The gaseous hydrogen was provided at a volumetric flow rate of 15 standard liters per minute and the gaseous nitrogen was provided at a volumetric flow rate of 5 standard liters per minute. As shown in the plot in FIG. 11, the power output of the fuel cell stack stabilized at about 572 Watts, which is significantly greater than the power output of a conventional fuel cell stack when such conventional fuel cell stack is used to process a mixture of hydrogen and nitrogen to generate electrical energy.

Figure 12:
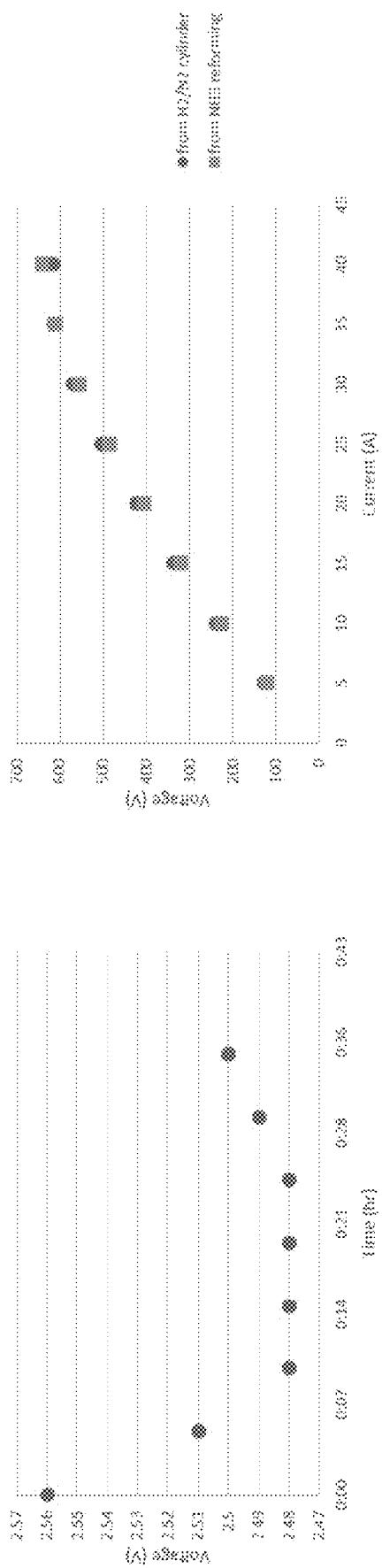
FIG. 12 schematically illustrates durability testing results for a stack of fuel cells with a multi-layer gas diffusion layer design with a hydrogen and nitrogen gas mixture stream produced from an ammonia reforming process, in accordance with some embodiments.

FIG. 12 schematically illustrates durability testing results for a stack of fuel cells with a multi-layer gas diffusion layer design with a hydrogen gas mixture produced from ammonia reforming process (3:1 hydrogen and nitrogen volume ratio), in accordance with some embodiments. Ammonia concentration in the hydrogen mixture may be kept below 1 ppm. A stack of five fuel cells were tested using the gas mixture produced during an ammonia reforming process. No appreciable differences in fuel cell performance were observed between a first test scenario involving the processing of reformate gases produced during ammonia reforming and a second test scenario involving the processing of a mixture of hydrogen and nitrogen. Further, no major degradations in fuel cell performance were observed over an operational time period of about 60 minutes.

Methods

In another aspect, the present disclosure provides a method for processing hydrogen. The method may comprise providing a reactor exit flow comprising hydrogen and/or nitrogen to one or more fuel cells. The reactor exit flow may be from a reactor or a reformer for catalytically decomposing ammonia. In some cases, the reactor exit flow may be from various components or subcomponents of a reformer for catalytically decomposing ammonia. The various components or subcomponents may comprise, for example, a reactor, an adsorbent tower, or a heat exchanger of the reformer. The method may further comprise using the one or more fuel cells to process the reactor exit flow to generate electricity (i.e., an electrical current).

The methods disclosed herein may be implemented using one or more fuel cells. The one or more fuel cells may be arranged in a fuel cell stack as disclosed elsewhere herein. In some non-limiting embodiments, the one or more fuel cells may comprise an anode, a cathode, and a membrane electrode assembly disposed between the anode and the cathode. In some cases, the anode may comprise a gas diffusion layer with one or more channels for directing a source material through the gas diffusion layer of the anode to facilitate processing of the source material to generate an electrical current. In some cases, the one or more channels may comprise one or more surface features configured to enhance a diffusion of the source material through the gas diffusion layer of the anode. The source material may comprise, for example, a gaseous mixture of hydrogen and nitrogen. In some cases, processing the source material may comprise dissociating one or more hydrogen molecules of the source material into one or more protons and one or more electrons.

In some cases, the one or more surface features may comprise one or more cuts or grooves on a surface of the one or more channels. The one or more cuts or grooves may extend across a portion of the surface of the one or more channels. In some cases, the one or more cuts or grooves may comprise two or more cuts or grooves that are parallel to each other. In other cases, the one or more cuts or grooves may comprise two or more cuts or grooves that are perpendicular to each other. In some cases, the one or more cuts or grooves may comprise two or more cuts or grooves that are disposed at an angle relative to each other. The angle may range from 0 degrees to about 90 degrees. In some cases, the one or more cuts or grooves may comprise two or more cuts or grooves that intersect with each other. In other cases, the one or more cuts or grooves may comprise two or more cuts or grooves that do not intersect.

In some cases, the one or more surface features may comprise one or more cutouts or openings on a surface of the one or more channels. The one or more cutouts or openings may extend across a portion of the surface of the one or more channels. In some cases, the one or more cutouts or openings may comprise two or more cutouts or openings that are parallel to each other. In other cases, the one or more cutouts or openings may comprise two or more cutouts or openings that are perpendicular to each other. In some cases, the one or more cutouts or openings may comprise two or more cutouts or openings that are disposed at an angle relative to each other. The angle may range from 0 degrees to about 90 degrees. In some cases, the one or more cutouts or openings may comprise two or more cuts or grooves that intersect with each other. In other cases, the one or more cutouts or openings may comprise two or more cutouts or openings that do not intersect.

In some embodiments, the gas diffusion layer of the anode may comprise one or more layers. In some cases, the one or more layers may comprise two or more layers. At least one layer of the two or more layers may comprise the one or more surface features. The one or more surface features may comprise (i) one or more cuts or grooves and/or (ii) one or more cutouts or openings. In some cases, the two or more layers may comprise a first layer comprising a first set of surface features and a second layer comprising a second set of surface features. In some cases, the first set of features and the second set of features may comprise a same or similar set of features. In other cases, the first set of features and the second set of features may comprise different sets of features. In some cases, the first set of features and the second set of features may overlap or partially overlap. In other cases, the first set of features and the second set of features may not or need not overlap.

Materials

In some cases, the anode gas diffusion layer may comprise a felt or a paper material. The felt or paper material may comprise, for example, graphite or another carbon-based material. In some cases, the felt or paper material may comprise a carbon felt, which may be similar to a cotton material. Alternatively, the felt or paper material may comprise a carbon paper, which may have similar features, properties, or characteristics to that of a sheet of paper. Both materials may be porous, and may have a different properties such as porosity, density, brittleness, and flexibility. In some instances, a denser material may provide better performance for the anode gas diffusion layer.

In cases where a single layer design is utilized, the material for the gas diffusion layer may need to be porous in order to diffuse hydrogen through the gas diffusion layer. In cases where a multi-layer design is utilized, the membrane side of the gas diffusion layer may comprise a porous sheet material and the current collecting side (where the channels are placed) may comprise any current conducting sheet material.

In some cases, the felt or paper material may comprise a carbon paper. The carbon paper may be manufactured by burning a carbon-based polymer sheet. The carbon felt or paper material may not or need not comprise a crystalline structure.

Computer Systems

Figure 13:
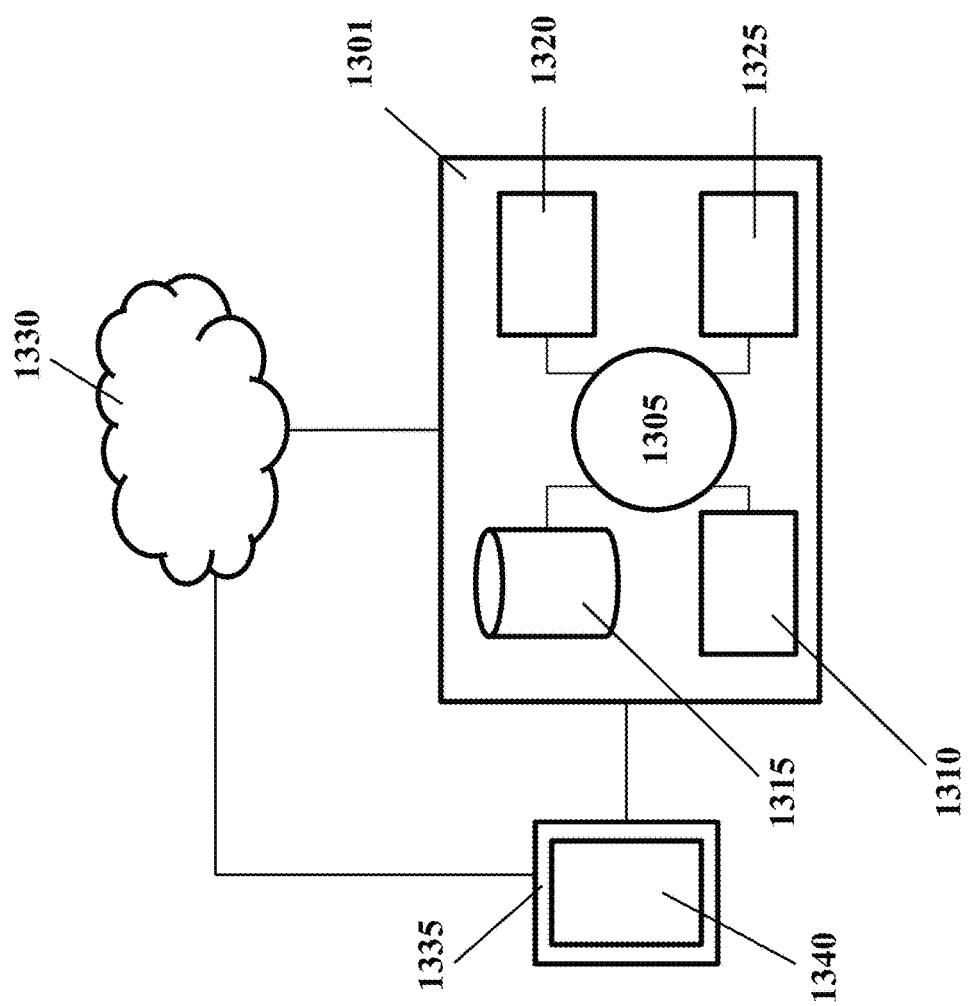
FIG. 13 schematically illustrates a computer system that is programmed or otherwise configured to implement methods provided herein.

In an aspect, the present disclosure provides computer systems that are programmed or otherwise configured to implement methods of the disclosure. FIG. 13 shows a computer system 1301 that is programmed or otherwise configured to implement a method for processing hydrogen and/or mixtures of hydrogen and nitrogen. The computer system 1301 may be configured to, for example, (i) control a flow of a source material comprising hydrogen and nitrogen to one or more fuel cells and (ii) control an operation of the one or more fuel cells to process the source material to generate electricity (e.g., an electrical current). The computer system 1301 can be an electronic device of a user or a computer system that is remotely located with respect to the electronic device. The electronic device can be a mobile electronic device.

The computer system 1301 may include a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are located external to the computer system 1301 (e.g., on a remote server that is in communication with the computer system 1301 through an intranet or the Internet).

The computer system 1301 can communicate with one or more remote computer systems through the network 1330. For instance, the computer system 1301 can communicate with a remote computer system of a user (e.g., an individual operating a reactor from which the source material comprising hydrogen and nitrogen is produced, an entity monitoring the operation of the reactor or one or more fuel cells operatively coupled to the reactor, or an end user operating a device or a vehicle that can be powered using electrical energy derived or produced from the source material using the one or more fuel cells). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, a portal for a user to monitor or track an operation or a performance of the one or more fuel cells. In some cases, the performance of the one or more fuel cells may comprise, for example, a voltage of the electrical current generated using the one or more fuel cells. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305. For example, the algorithm may be configured to control an operation of the one or more fuel cells based on one or more sensor readings (e.g., temperature measurements, flow rates, etc.), based on a power demand, or based on a performance of the one or more fuel cells.

System-Level Configurations

In some embodiments, the one or more fuel cells may be in fluid communication with one or more reactor modules for catalytically decomposing ammonia. The one or more fuel cells may be configured to receive hydrogen and/or nitrogen produced or extracted using the one or more reactor modules, and to process the hydrogen/nitrogen mixture to generate electrical energy.

In some cases, the fuel cell units may be in fluid communication with one or more reactors. The one or more reactors may be configured to catalytically decompose ammonia to generate hydrogen. The exit flow from the one or more reactors may comprise hydrogen, nitrogen, and/or unconverted ammonia. The exit flow from the one or more reactors may be directed to the one or more fuel cell units, which may be configured to use (i.e., process) the exit flow or any portion thereof to generate electrical energy.

In some cases, the exit flow from the one or more reactors may be directed to one or more adsorption towers to remove excess or trace ammonia before the reactor exit flow is directed to the one or more fuel cell units. The adsorption towers may help to preserve a performance and/or a longevity of the one or more fuel cells since ammonia can be detrimental to the fuel cells. The adsorption towers may comprise one or more adsorbents which may be replaceable (e.g., a cartridge form factor) after a certain number of cycles or operations.

In some cases, the fuel cell units may be in fluid communication with a plurality of adsorption towers. The plurality of adsorption towers may comprise at least a first adsorption tower and a second adsorption tower. The first and/or second adsorption tower may be used to remove any traces of ammonia from the reactor exit flow before the reactor exit flow is directed to the one or more fuel cells. While the first adsorption tower is being used, the second adsorption tower may be regenerated. Once the first adsorption tower is fully discharged, the second adsorption tower may be partially or fully regenerated and ready for use in another cycle or operation. In any of the embodiments described herein, two, three, four, five, six, seven, eight, nine, ten, or more adsorption towers may be used to filter the reactor exit flow before the reactor exit flow reaches the one or more fuel cell units.

Fuel Cell Exit Flow

In some cases, the fuel cells may have a fuel cell exit flow. The exit flow from the fuel cells may comprise $H_2$, $N_2$, and/or one or more reaction byproducts (e.g., water). In some cases, the fuel cell exit flow may comprise unconverted hydrogen from the fuel cells. In some cases, the unconverted hydrogen may be directed back to the one or more reactors for combustion heating to heat the reactors for further ammonia decomposition. In some cases, the fuel cell exit flow may comprise unconverted hydrogen from the fuel cells, unconverted ammonia from the reactors, or un-adsorbed ammonia from the adsorption towers. In some cases, the unconverted hydrogen from the fuel cells and the unconverted or un-adsorbed ammonia from the reactors or the adsorption towers may be directed back to the one or more reactors for combustion heating to heat the reactors for further ammonia decomposition.

Vehicle Compatibility

In some cases, the one or more fuel cell units may be adapted for use on an aerial vehicle. The aerial vehicle may comprise, for example, a manned aerial vehicle, an unmanned aerial vehicle, or a drone. In some cases, the fuel cell units may be integrated into a body of the aerial vehicle. In other cases, the fuel cell units may be placed on top of or underneath a body of the aerial vehicle.

In some cases, the one or more fuel cell units may be adapted for use on a terrestrial vehicle, such as a car or an automobile. The one or more fuel cell units may be placed in or near a front portion of the terrestrial vehicle (e.g., in an engine bay of the vehicle). The one or more fuel cell units may be placed in or near an underside region of the terrestrial vehicle. The one or more fuel cell units may be placed near a rear end of the terrestrial vehicle. In some cases, the one or more fuel cell units may be placed near an axle of the terrestrial vehicle (e.g., a front wheel axles and/or a rear wheel axle of the vehicle).

In some cases, the one or more fuel cell units may be adapted for use on a terrestrial vehicle, such as a truck or a semi-trailer truck. In some cases, the one or more fuel cell units may be coupled to or integrated into a rear portion of a tractor unit of the truck. The tractor unit (also known as a prime mover, truck, semi-truck, semi-tractor, rig, big rig, or simply, a tractor) may comprise a heavy-duty towing engine that provides motive power for hauling a towed or trailered-load. In some cases, the one or more fuel cell units may be positioned in or near a front portion of the tractor unit (e.g., in the engine bay of the tractor unit). In other cases, the one or more fuel cell units may be placed in or near an underside region of the tractor unit. In some cases, the plurality of fuel cell units may be distributed along the underside of the tractor unit. In some cases, one or more of the fuel cell units may be placed near an axle (e.g., a front axle) of the tractor unit.

Arrangement of Fuel Cell Modules

In another aspect, the present disclosure provides a plurality of fuel cell modules comprising any one or more of the fuel cells described herein. In some cases, the fuel cell modules may comprise a stack of fuel cell modules. The stack of fuel cell modules may comprise at least two or more fuel cell modules. In some cases, the at least two or more fuel cell modules may be positioned on top of each other or side by side in a lateral configuration.

In some cases, the plurality of fuel cell modules may be positioned adjacent to each other. In other cases, the plurality of fuel cell modules may be located remote from each other (i.e., in or on different sides, regions, or sections of a vehicle). In some cases, the plurality of fuel cell modules may be oriented in a same direction. In other cases, at least two of the plurality of fuel cell modules may be oriented in different directions. In any of the embodiments described herein, the plurality of fuel cell modules may be positioned and/or oriented appropriately to maximize volumetric efficiency and minimize a physical footprint of the plurality of fuel cell modules. In any of the embodiments described herein, the plurality of fuel cell modules may be positioned and/or oriented to conform with a size and/or a shape of the vehicle in or on which the fuel cell modules are placed or provided. In any of the embodiments described herein, the plurality of fuel cell modules may be positioned and/or oriented to conform with a size and/or a shape of the vehicle to which the fuel cell modules are coupled or mounted.

In any of the embodiments described herein, the fuel cell modules may be placed in or on different sides, regions, or sections of a vehicle. The fuel cell modules may be positioned and/or oriented appropriately to maximize volumetric efficiency and minimize a physical footprint of the fuel cell modules. The fuel cell modules may be positioned and/or oriented to conform with a size and/or a shape of the vehicle in or on which the fuel cell modules are placed or provided. The fuel cell modules may be positioned and/or oriented to conform with a size and/or a shape of the vehicle to which the fuel cell modules are coupled or mounted.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A fuel cell, comprising:
an anode;
a cathode; and
a membrane between the anode and the cathode,
wherein the anode comprises an anode gas diffusion layer with one or more channels for directing a source material comprising hydrogen and nitrogen to the anode for processing of the source material to generate an electrical current,
wherein the one or more channels comprise two or more features comprising (i) one or more cuts or (ii) one or more cutouts configured to enhance diffusion and transport of the source material through the anode gas diffusion layer, and
wherein the two or more features are configured to direct a flow of nitrogen from the anode gas diffusion layer out of the fuel cell so that nitrogen does not accumulate in the anode gas diffusion layer.

2. The fuel cell of claim 1, wherein the two or more features are further configured to facilitate purging of a select material from the anode gas diffusion layer, wherein the select material comprises one or more of nitrogen, ammonia, water, or one or more impurities.

3. The fuel cell of claim 2, further comprising one or more exit ports for discharging the select material and unconverted hydrogen from the fuel cell.

4. The fuel cell of claim 1, wherein the processing of the source material comprises a dissociation of one or more hydrogen molecules of the source material into one or more protons and one or more electrons.

5. The fuel cell of claim 1, wherein the anode gas diffusion layer comprises a felt or a paper material.

6. The fuel cell of claim 5, wherein the felt or paper material is a carbon-based material.

7. The fuel cell of claim 1, wherein the two or more features extend across at least a portion of the surface of the one or more channels.

8. The fuel cell of claim 1, wherein the two or more features are parallel to each other.

9. The fuel cell of claim 1, wherein the two or more features are perpendicular to each other.

10. The fuel cell of claim 1, wherein the two or more features are disposed at an angle relative to each other, wherein the angle ranges from 0 degrees to 90 degrees.

11. The fuel cell of claim 1, wherein the two or more features intersect with each other.

12. The fuel cell of claim 1, wherein the two or more features do not intersect.

13. The fuel cell of claim 1, wherein the anode gas diffusion layer comprises a plurality of layers.

14. The fuel cell of claim 13, wherein at least one layer of the plurality of layers comprises the one or more channels comprising the two or more features.

15. The fuel cell of claim 13, wherein the plurality of layers comprises a first layer comprising a first set of features and a second layer comprising a second set of features.

16. The fuel cell of claim 15, wherein the first set of features and the second set of features comprise a same or similar set of features.

17. The fuel cell of claim 15, wherein the first set of features and the second set of features comprise different sets of features having different shapes, dimensions, positions, or orientations.

18. The fuel cell of claim 15, wherein the first set of features and the second set of features overlap or partially overlap.

19. The fuel cell of claim 15, wherein the first set of features and the second set of features do not overlap.

20. A fuel cell system, comprising:
a plurality of fuel cells comprising the fuel cell of claim 1,
at least one ammonia reformer or reactor in fluid communication with the plurality of fuel cells, wherein the at least one ammonia reformer or reactor is configured to (i) generate the source material and (ii) provide the source material to the fuel cell.

21. The fuel cell system of claim 20, wherein the plurality of fuel cells are arranged (i) adjacent to each other in a lateral configuration or (ii) on top of each other in a stacked configuration.

22. The fuel cell system of claim 20, wherein the plurality of fuel cells comprises at least one proton-exchange membrane fuel cell (PEMFC).

23. The fuel cell of claim 1, wherein a feature of the two or more features has a depth ranging from about 0.01 millimeter (mm) to about 10 mm.

24. The fuel cell system of claim 20, wherein a feature of the two or more features has a depth ranging from about 0.01 millimeter (mm) to about 10 mm.

25. A fuel cell system comprising the fuel cell of claim 1, wherein the fuel cell system comprises a computer configured to operate the fuel cell to allow purging of nitrogen from the fuel cell while the fuel cell is generating electricity.

26. The fuel cell system of claim 24, further comprising a computer configured to operate the fuel cell to allow purging of nitrogen from the fuel cell while the fuel cell is generating electricity.

27. The fuel cell system of claim 26, wherein the fuel cell system further comprises one or more inlet ports configured to receive the source material, wherein ammonia concentration in the source material is below 1 ppm.

28. The fuel cell system of claim 27, wherein the fuel cell system further comprises one or more exit ports configured to direct unconverted hydrogen from the plurality of fuel cells to the at least one ammonia reformer or reactor for combustion heating.

* * * * *